(No Model.)

A. A. ALLEN.
CHECK HOOK ATTACHMENT FOR HARNESS.

No. 351,951. Patented Nov. 2, 1886.

WITNESSES

INVENTOR
Alton A. Allen

By his Atty.

UNITED STATES PATENT OFFICE.

ALTON A. ALLEN, OF FALL RIVER, MASSACHUSETTS.

CHECK-HOOK ATTACHMENT FOR HARNESS.

SPECIFICATION forming part of Letters Patent No. 351,951, dated November 2, 1886.

Application filed August 10, 1886. Serial No. 210,506. (No model.)

*To all whom it may concern:*

Be it known that I, ALTON A. ALLEN, of Fall River, in the county of Bristol and State of Massachusetts, have invented a new and useful Improvement in Check-Hooks for Harness, of which the following is a specification.

This improvement relates to that class of check-hooks in which the hook proper is held down upon its seat by a spring, and is lifted against the said spring to remove or put in the check-rein; and it consists in the below-described novel combination of parts, whereby the hook is securely and rigidly fastened to the saddle without danger of rotary or other movement, and without projecting parts to injure the back of the horse.

Figure 1:
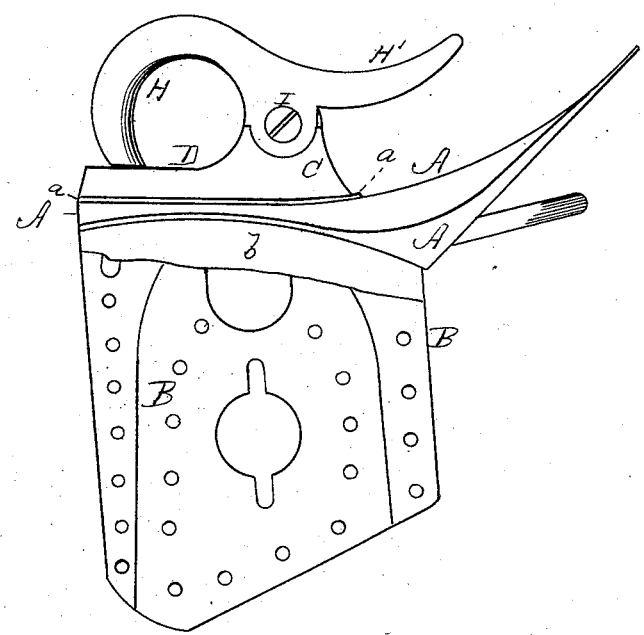
Figure 2:
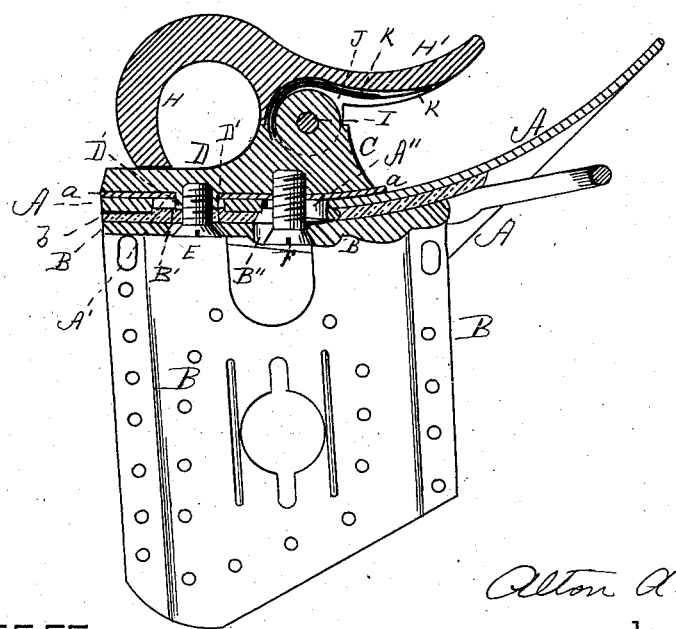

In the accompanying drawings, in which similar letters of reference indicate like parts, Figure 1 is a side elevation of a check-hook embodying my invention in position on the saddle. Fig. 2 is a longitudinal vertical section of the same.

A represents a plate forming a portion of the saddle, and *a* a portion of the leather covering on said plate.

B is the tree, and *b* a portion of the covering thereof. The stationary portion of the check-hook consists of the post C and the seat D. A short screw, E, passes upward through an opening, B', in the tree B into a threaded projection, D', extending downward from the seat D into the perforation A' in the plate A. This projection D' is preferably rectangular in shape, in order to more nearly fit into the perforation A' in the saddle plate, which is usually rectangular in shape. A longer screw, F, passes upward through an opening, B'', in the tree, and a perforation, A'', in the plate, for a considerable distance, into a threaded opening in the post C, said post being made purposely of sufficient height to admit said long screw F. By the use of two screws the stationary portion of the check-hook is firmly and rigidly secured to the saddle.

It will be observed that no nuts or washers are used, and the fastening-screws have their heads flush with the under surface of the saddle-tree, thus preventing any galling of the horse, and rendering it perfectly practicable to do without a saddle-pad.

The movable portion of the check-hook consists of the hook H, provided with the extension H', and pivoted, by means of the screw I, to the post C. The hook is provided with a curved chamber, J, on its under side, of substantially the shape shown, in which are one or more springs, K, whereby the hook is held normally down upon the seat D. By means of this chamber the springs are practically out of sight and protected from the action of the weather or from careless handling. The check-rein passes, of course, around the hook H, and cannot by any means slip off therefrom, but may be released quickly and easily—as for the purposes of watering—by pressing down the extension H'.

I am aware that a pivoted check-hook is not new, in itself considered, and that a spring has been used whereby to hold the same normally closed; hence I claim neither to be new in this invention.

Having thus fully described my invention, what I claim, and desire to secure by Letters Patent, is—

1. The spring check-hook described, consisting of the movable portion H H', provided with the spring K, and the stationary portion D C, provided with the projection D', for fitting into a corresponding perforation in the plate A, in combination with the plate A, provided with the perforations A' A'', and tree B, provided with the openings B' B'', and the screws E F, passing through said tree and plate into the check hook and flush with the under surface of the tree, substantially as and for the purpose set forth.

2. The combination of the pivoted movable portion H H', provided with the curved chamber J for receiving the spring K, the stationary portion consisting of the seat D and post C, said seat being provided with the dropped projection D', the plate A, provided with the perforations A' A'', the tree B, provided with the openings B' B'', the short screw E, passing through the openings B' A' into said seat, and the long screw F, passing through the openings B'' A'' into said post, both said screws being flush with the under surface of the tree, substantially as and for the purpose described.

ALTON A. ALLEN.

Witnesses:
R. W. ALLEN,
R. N. ALLEN.